March 4, 1969
J. K. TRUITT
3,431,146
METHOD OF OXIDIZING RESIDUAL $H_2S$ TO $SO_2$ IN A FUEL CELL
Filed Aug. 13, 1964
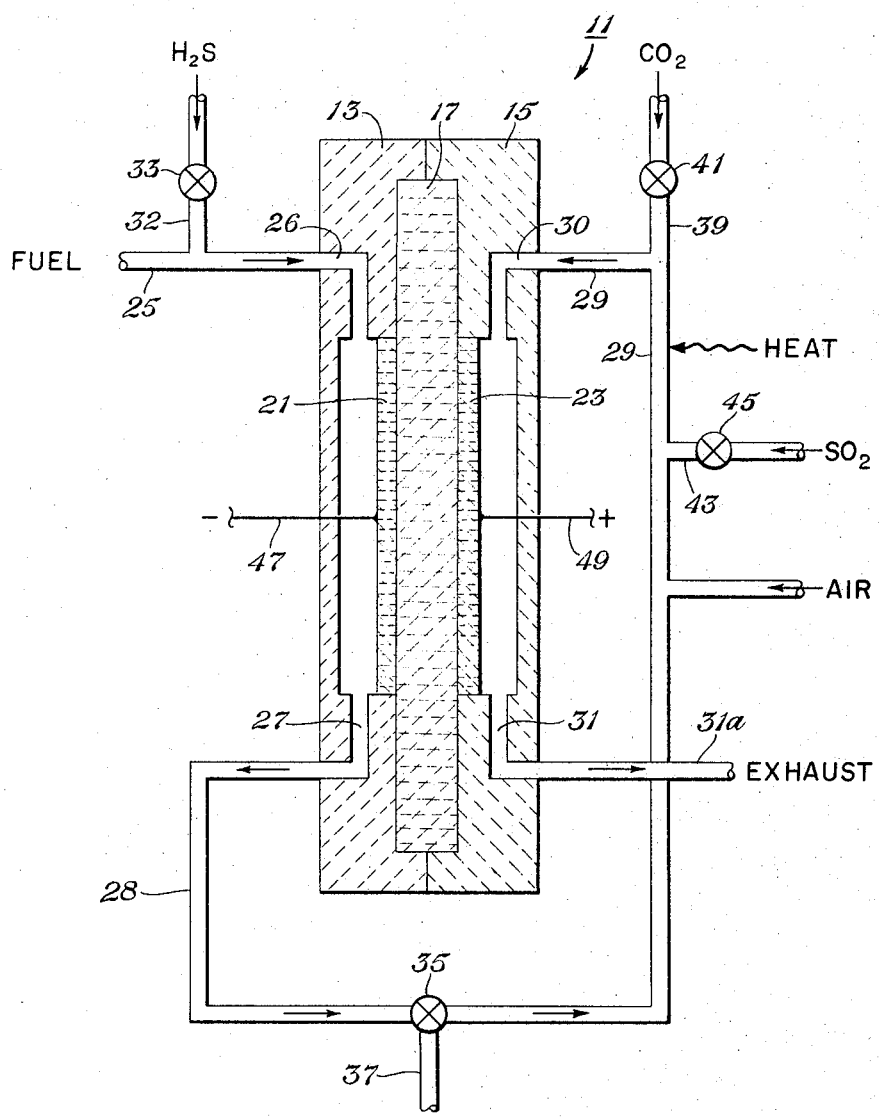
INVENTOR.
James K. Truitt
BY William E. Farris, Jr.
ATTORNEY United States Patent Office 3,431,146
Patented Mar. 4, 1969

3,431,146
METHOD OF OXIDIZING RESIDUAL H₂S TO SO₂ IN A FUEL CELL
James K. Truitt, Dallas, Tex., assignor to Texas Instruments Incorporated, Dallas, Tex., a corporation of Delaware
Filed Aug. 13, 1964, Ser. No. 389,255
U.S. Cl. 136—86          3 Claims
Int. Cl. H01m 27/30

ABSTRACT OF THE DISCLOSURE

Disclosed is a fuel cell and method wherein hydrogen sulfide is combined with a fuel gas containing free hydrogen and introduced into contact with the fuel electrode of the fuel cell. The spent fuel leaving the fuel electrode is reacted in a conduit interconnecting the fuel electrode exhaust gas outlet with the oxidizer electrode inlet to convert the residual hydrogen sulfide present in the spent fuel into sulfur dioxide. An oxidizer is also fed into the oxidizer electrode inlet along with the spent fuel and sulfur dioxide.

---

This application relates to power promotion for fuel cells; more specifically, it relates to methods and apparatus for increasing the power output obtainable from molten carbonate fuel cells.

Molten carbonate fuel cells are known in the art. Such cells conventionally operate at a high temperature, sufficient to keep the carbonate electrolyte molten. Commonly the fuel feed to the fuel electrode is a stream of hydrogen and the oxidizer feed to the oxidizer electrode is a gaseous mixture of oxygen and carbon dioxide.

While molten carbonate fuel cells of the prior art are satisfactory for many purposes, it would be most desirable if the power output of such cells, based on watts per square foot of electrode area, for example, could be materially increased for certain periods of operation when a high demand exists in the external circuit for which the cell is producing power.

Accordingly, it is an object of the present invention to provide methods and apparatus for at least temporarily increasing the power output obtainable from a molten carbonate fuel cell, including a plurality of such cells arranged in series and/or parallel. It is a further object to provide such methods and apparatus by which a power increase for a temporary high load condition may be realized without substantially damaging or impairing the fuel cell system involved. Moreover, it is an object to provide a method and system capable of providing a power increase to meet peak load demands in a simple and economical, yet effective manner.

In accordance with the present invention, a novel step of contacting the fuel electrode with sulfur in a negative valence state is provided for a fuel cell system in which a fuel and an oxidizer are reacted at respective fuel and oxidizer electrodes in contact with a molten carbonate electrolyte.

In a preferred embodiment, a sulfide is introduced into the fuel feed, which preferably contains hydrogen gas, as hydrogen sulfide. The mixture of hydrogen sulfide and hydrogen-containing fuel then contacts the fuel electrode, which preferably comprises a metal selected from the group consisting of nickel, cobalt and iron.

In accordance with another aspect of the present invention, the fuel electrode is contacted with hydrogen sulfide while fuel is being reacted at the electrode. Thereafter, residual quantities of hydrogen sulfide remaining after its contact with the fuel electrode are oxidized, and the product resulting from oxidation of the hydrogen sulfide, together with all the spent fuel gases from the fuel electrode, is conducted into contact with the oxidizer electrode while that electrode is being contacted by oxidizer.

In its apparatus aspects, one aspect of this invention provides means for introducing hydrogen sulfide into the fuel being conducted to the fuel electrode of a carbonate fuel cell prior to the reaction of that fuel with the fuel electrode.

In another apparatus aspect, means for oxidizing residual hydrogen sulfide after its contact with the fuel electrode and means for introducing a mixture of the oxidized residual hydrogen sulfide, along with spent fuel from the fuel electrode, into contact with the oxidizer electrode are provided.

For a more complete understanding of the present invention and for further objects and advantages thereof, reference may now be had to the following description taken in conjunction with the accompanying drawing, FIGURE 1, which rather schematically illustrates a transverse cross-sectional view of a molten carbonate fuel cell, including provision for selective introduction of hydrogen sulfide and/or sulfur dioxide into the cell system.

Referring now to the figure in greater detail, therein a fuel cell is illustrated generally at 11. It is to be understood that fuel cell 11 is merely an example of one form of molten carbonate fuel cell and that various other fuel cell configurations and systems might be substituted for the specific one chosen for the illustration of the figure.

Fuel cell 11 has an outer casing made up of the two casing halves 13 and 15. Porous magnesium oxide disk 17 is centrally enclosed between the casing halves 13 and 15. It is permeated with a sodium-lithium carbonate eutectic mixture (50% molar sodium carbonate and 50% molar lithium carbonate) in molten state, the cell being maintained at a temperature of above the melting point of the sodium-lithium carbonate. One electrode is provided by porous sintered electrode 21 (the anode, often referred to hereinafter as the fuel electrode) which joins an outer face of the disk 17, and the other by porous sintered electrode 23 which joins the other outer face of disk 17. The later electrode is the cathode, also often referred to herein as the oxidizer electrode. The fuel electrode 21 is preferably of a material comprising a substantial quantity of nickel, cobalt or iron. For example, it may be of stainless steel, of a silver-nickel alloy, or of pure nickel. The oxidizer electrode 23 is preferably of silver, although various other metals may be used.

Fresh fuel conduit 25 leads to fuel inlet passage 26 in casing half 13. Spent fuel outlet 27 is also provided in casing half 13 and it connects to spent fuel conduit 28, which joins oxidizer inlet conduit 29, which in turn leads to oxidizer inlet passage 30 in casing half 15. Spent oxidizer outlet 31, also in casing half 15, leads to exhaust 31a. Hydrogen sulfide conduit 32, including flow control valve 33, joins the fresh fuel conduit 25 with a source of hydrogen sulfide gas. Valve 35 is provided in spent fuel conduit 28. In one position valve 35 permits flow straight through conduit 28; in an alternate position it conducts material entering conduit 28 through an outlet 37. A carbon dioxide inlet 39, provided with a valve 41, connects to oxidizer inlet conduit 29. A sulfur dioxide inlet 43, including a valve 45, also connects to oxidizer inlet conduit 29. Suitable wires 47 and 49 are conductively joined with the electrodes 21 and 23 and pass through the casing halves 13 and 15, respectively, to connect with an external circuit.

In one mode of operation, a fuel gas containing a substantial quantity of hydrogen (for example, a pure stream of hydrogen) is fed into the fuel cell 11 of the figure through fresh fuel conduit 25 and inlet passage 26. It passes adjacent and partially permeates pore structure of fuel electrode 21. Spent fuel gas thereafter passes out of the cell through spent fuel outlet 27 via spent fuel conduit 28 to join air (or pure oxygen or other oxidizer gas containing oxygen) being fed into the fuel cell 11 through oxidizer inlet conduit 29 and oxidizer inlet passage 30. The spent fuel provides carbon dioxide for the oxidizer electrode, i.e. electrode 23—the cathode. The air and spent fuel mixture pass adjacent and partially permeate pore structure of the oxidizer electrode 23. The exhaust from oxidizer electrode 23 discharges through the exhaust 31a via spent oxidizer outlet 31. The sintered electrodes 21 and 23 provide interfaces between the fuel and the electrolyte, and the air-carbon dioxide mixture and electrolyte, respectively, which function as fuel and oxidizer electrodes in contact with an electrolyte of the cell. The reaction at the fuel electrode (electrode 21) is as follows:

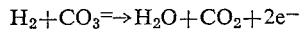

The reaction at the oxidizer electrode (electrode 23) is as follows:

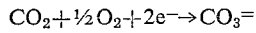

If it is desired that the foregoing system produce increased power, the valve 33 in hydrogen sulfide conduit 32 is opened and hydrogen sulfide gas is admitted into fresh fuel conduit 25 to join fuel entering the fuel cell 11. The exhaust gases from the fuel electrode will normally contain certain residual quantities of hydrogen sulfide which have not reacted in passing by the fuel electrode 21. Accordingly, such quantities of hydrogen sulfide pass through outlet 27 in mixture with spent fuel and reaction products (e.g. $SO_2$) of hydrogen sulfide. This mixture passes through conduit 28 to join air entering in oxidizer conduit 29 and the resulting gaseous mixture passes adjacent the oxidizer electrode 23 in reactive contact therewith. Note that the addition of heat is indicated schematically in FIGURE 1 to the mixture of air and spent fuel gases flowing in conduit 29. With the gases heated, for example to a temperature of about 600° C., the hydrogen sulfide present in the gaseous mixture is substantially all oxidized to sulfur dioxide. Thus, sulfur present adjacent the oxidizer electrode is in the form of sulfur dioxide rather than in the form of hydrogen sulfide. This appears to be important for two reasons. First, hydrogen sulfide appears to be deleterious to the oxidizer electrode and it is desirable to minimize or eliminate its presence adjacent that electrode. Secondly, sulfur dioxide in contact with the oxidizer electrode together with the usual oxidizer gas (in this example, air) appears to enhance the power output of the cell. It is thus seen desirable to oxidize trace quantities of hydrogen sulfide and to conduct sulfur dioxide resulting from reaction adjacent the fuel electrode or from subsequent oxidation of residual hydrogen sulfide into contact with the oxidizer electrode.

While the oxidation step has been schematically illustrated in the form of addition of heat to the flow line which carries the combination of inlet air and spent gases from the fuel electrode, it should be appreciated that sufficient heat may be effectively transferred to the gaseous mixture from the fuel cell 11 itself. Proximity of the flow conduit 29 to the cell, including proper insulation, will provide sufficient heat transfer from the cell to the gaseous mixture to accomplish oxidation. Moreover, with the flow rates properly adjusted to provide adequate contact time between the gases, the oxidizer inlet passage 30 provides adequate means to accomplish the oxidation step prior to the contact of the mixed gases with the oxidizer electrode 23.

Although the fuel cell illustrated in FIGURE 1 is an integrated type of system in which spent fuel gas, including the hydrogen sulfide reaction product and residual quantities of hydrogen sulfide, are conducted to join air and provide an oxidizer-sulfur dioxide mixture to the oxidizer electrode, such integration is not required. For example, the mixture of spent fuel gas and hydrogen sulfide-hydrogen sulfide reaction product may be conducted from the cell via outlet 37 and discarded. If this is done, it is necessary to open valve 41 to permit carbon dioxide to flow through conduit 39 and join the air flowing through conduit 29 in order that the necessary oxidizer gases are provided adjacent the oxidizer electrode 23.

In another mode of operation, sulfur dioxide is introduced through conduit 43 (valve 45 is in open position) from an external source into the oxidizer mixture which enters the cell via oxidizer conduit 29 and oxidizer passage 30. When the system is operated with sulfur dioxide introduced in such a manner, either with or without concurrent introduction of hydrogen sulfide to the fuel electrode feed gas, an improvement in power output of the cell is noted.

It is thus seen that hydrogen sulfide promotes an increase in power output when it is contacted with the fuel electrode together with the usual fuel thereto. Moreover, it is seen that sulfur dioxide promotes an increased power output when it is introduced into contact with the oxidizer electrode together with the usual oxidizer. And finally, it is seen that it is possible to operate the system in such a way that the hydrogen sulfide reaction product from the fuel side of the system may be oxidized with air entering the oxidizer side of the system to provide sulfur dioxide feed to the oxidizer electrode.

The following examples are offered by way of further explanation and clarification. They are merely illustrative of how the invention may be practiced and are not intended to be taken as limiting in scope.

EXAMPLE 1

The fuel cell system of FIGURE 1 (with the sodium-lithium carbonate eutectic at 600° C.) is operated with the valve 33 closed and with the valve 35 positioned so that spent fuel flows through conduit 28 to join air entering the fuel cell. Valves 41 and 45 are closed. The fuel is hydrogen gas flowing at a rate of 480 cc. per minute (measured at one atmosphere and 25° C.). The flow rate of air introduced is 400 cc. per minute (one atmosphere, 25° C.). The power output at .7 volt is measured to be approximately 40 watts per square foot.

EXAMPLE 2

Example 1 is repeated, except that after a short period of operation in accordance with Example 1, the valve 33 is opened and hydrogen sulfide is admitted at the flow rate of 10 cc. per minute (one atmosphere, 25° C.) for one minute. An almost immediate improvement in power output is noted which disappears rather rapidly after the one minute flow of hydrogen sulfide has passed. The power output while the hydrogen sulfide is passing through the system is found to be approximately 60 watts per square foot at .7 volt, an improvement of 50% over Example 1. Note that design of the fuel cell system was such that heat transfer from the cell accomplished oxidation of the residual hydrogen sulfide prior to contact of the oxidizer gases with the oxidizer electrode.

EXAMPLE 3

Example 2 is repeated except that the valve 35 is positioned to conduct spent fuel and hydrogen sulfide mixture out of the fuel cell system through outlet 37. Valve 41 is maintained in the open position to admit carbon dioxide at the rate of about 200 cc. per minute (one atmosphere, 25° C.) to provide a suitable oxidizer mixture to the oxidizer electrode. The power output is found to be substantially improved by the addition of hyrogen sulfide, although not quite so much as was the case when the outlet gases from the fuel side of the system were conducted to join the oxidizer air and contact the oxidizer electrode, as in the prior example.

EXAMPLE 4

Example 1 is repeated, except that the sulfur dioxide valve 43 is opened and sulfur dioxide is admitted at the rate of one cc. per minute (one atmosphere, 25° C.) for about one hour. A small but definite sustained power improvement in cell output throughout the one hour of operation (and, for that matter, a considerable period thereafter) with the sulfur dioxide is noted.

EXAMPLE 5

Example 1 is repeated with all conditions the same, except that the sodium-lithium carbonate electrolyte has added to it aproximately 10 mole percent by weight of sodium sulfide prior to operation. The power output of the cell is about 25% more than was the case in Example 1.

EXAMPLE 6

Example 2 is repeated, except that hydrogen sulfide is introduced at a flow rate of one cc. per minute (one atmosphere, 25° C.) for two hours. A comparatively small, but definite power output increase is noted throughout the period of operation with the hydrogen sulfide.

From the foregoing examples it is seen that the presence of sulfide adjacent the fuel electrode increases the power output of the system quite substantially. It is also seen that the presence of sulfur dioxide adjacent the oxidizer electrode increases power output somewhat. While it is not known why increased power output results in either of these instances, certain possibilities have been considered. For example, the presence of sulfide on the fuel electrode may enhance the wetting of that electrode by electrolyte and facilitate the reaction occurring between electrolyte and fuel at that electrode. Also, it is possible that hydrogen sulfide's reaction with the electrolyte in the presence of the usual fuel gas (hydrogen in the examples given) directly contributes to the power output. The sulfide may act as a promoter or catalyst for the fuel, or it may act as a promoter or catalyst for the electrolyte itself. Similar theories can be offered with regard to the effect of the sulfur dioxide, for example, it may activate or catalyze reaction of oxidizer at the oxidizer electrode or it may react directly with the electrolyte at the oxidizer electrode. In any event, improvement does occur in power output as a result of addition of hydrogen sulfide to the fuel and as a result of the presence of sulfur dioxide in the oxidizer and it is not intended that this invention or its interpretation be in any way bound or limited by the various theories advanced above.

It is preferred that the fuel electrode of this invention, when operating with hydrogen sulfide in the fuel feed, contain appreciable quantities of nickel, cobalt and/or iron. For example, sintered nickel anodes are quite effective for practice of the present invention. It is to be understood that the electrode need not be sintered. For example, screen electrodes in a free electrolyte-type "bubble" cell may be used.

A preferred temperature of operation of a molten carbonate cell embodying practice of the present invention is in excess of about 500° C.

Having described the invention in connection with certain specific embodiments thereof, it is to be understood that further modifications may now suggest themselves to those skilled in the art and it is intended to cover such modifications as fall within the scope of the appended claims.

What is claimed is:

1. In the method of producing power by operation of a fuel cell system in which a gaseous fuel comprising hydrogen and a gaseous oxidizer comprising oxygen are reacted at respective fuel and oxidizer electrodes in contact with a molten carbonate electrolyte, the steps of:
    (a) introducing hydrogen sulfide and a fuel containing free hydrogen into a first conduit means to form a mixture of said hydrogen sulfide and fuel,
    (b) introducing said mixture into contact with said fuel electrode,
    (c) oxidizing the residual hydrogen sulfide remaining in the spent fuel exhaust from said fuel electrode in second conduit means interconnecting the exhaust outlet of said fuel electrode and the oxidizer inlet of said oxidizer electrode to change the residual hydrogen sulfide into sulfur dioxide, and
    (d) introducing a gaseous oxidizer comprising oxygen into said second conduit means to join the mixture of spent fuel and sulfur dioxide resulting from step (b) hereof whereby said oxidizer, said spent fuel and said sulfur dioxide are brought into contact with said oxidizer electrode.

2. The method of claim 1 characterized by the introduction of carbon dioxide into said second conduit means.

3. The method of claim 1 wherein the ratio by volume of free hydrogen to hydrogen sulfide introduced into said first conduit means is at least about 49 to 1.

References Cited

UNITED STATES PATENTS

| | | | |
|---|---|---|---|
| 3,150,998 | 9/1964 | Reitemeier | 136—86 |
| 3,147,149 | 9/1964 | Postal | 136—86 |
| 3,266,941 | 8/1966 | Johnson | 136—86 |

WINSTON A. DOUGLAS, *Primary Examiner.*

H. FEELEY, *Assistant Examiner.*